Aug. 15, 1972          R. E. HAYWARD, JR                 3,684,601
     METHOD OF PRODUCING A SOFT OUTER SURFACE OF FINE
              DENIER FIBER ON A NONWOVEN FABRIC
                  Original Filed March 29, 1965
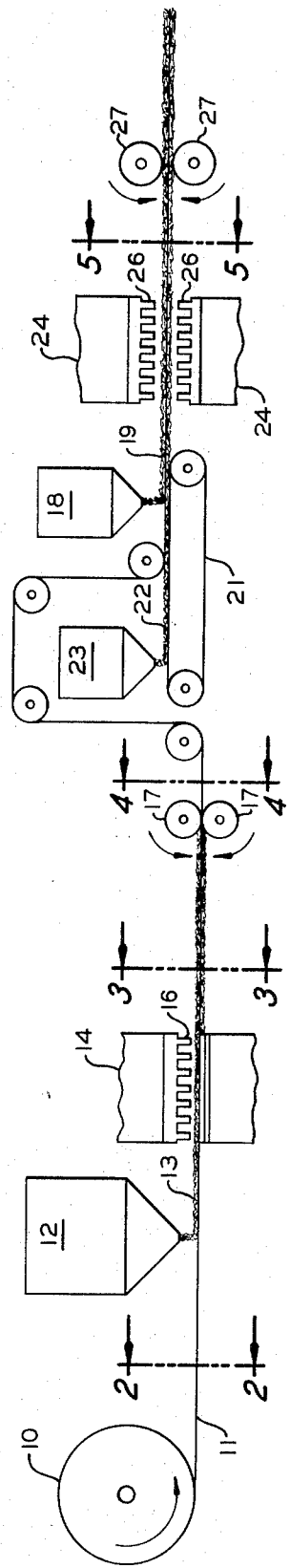
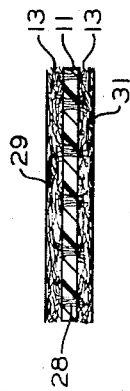
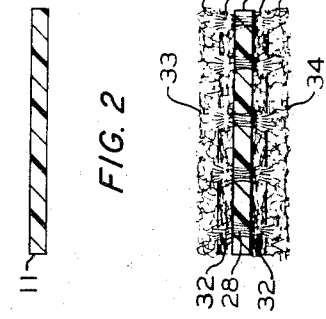
INVENTOR
R.E. HAYWARD
BY
Young and Quigg
ATTORNEYS United States Patent Office 3,684,601
Patented Aug. 15, 1972

3,684,601
METHOD OF PRODUCING A SOFT OUTER SURFACE OF FINE DENIER FIBER ON A NONWOVEN FABRIC
Richard E. Hayward, Jr., Charlotte, N.C., assignor to Phillips Petroleum Company
Continuation of application Ser. No. 443,317, Mar. 29, 1965. This application Dec. 29, 1969, Ser. No. 888,168
Int. Cl. B32b 5/06, 5/26
U.S. Cl. 156—148                    6 Claims

ABSTRACT OF THE DISCLOSURE

A nonwoven fabric having a soft textured outer surface is produced by needling a layer of heat-sealable fibers to a polymer film said film having a melting point less than the melting point of said fibers, and heating the composite to impart strength thereto by fusing the individual fibers at both outer surfaces of the composite and melting said polymer film to interlock the fibers.

---

This application is a continuation of application Ser. No. 443,317, filed Mar. 29, 1965, now abandoned.

This invention relates to non-woven fabrics. In one aspect, this invention relates to a method of producing non-woven fabrics. In another aspect, this invention relates to a non-woven fabric having improved properties including dimensional stability, surface texture, strength, and flexibility.

The prior art methods of manufacturing a non-woven fabric involve the use of a base sheet of rubber or equivalent synthetic material. In the production of the non-woven fabric, a mat of fibers is deposited on the base sheet and needled to cause some of the individual fibers in the mat to be driven into the base sheet. The elasticity of the base sheet will cause the rubber to grip the individual fibers thereby maintaining the mat of fibers in intimate contact with the base sheet. Non-woven fabrics produced in this manner are undesirable because of the ease at which the individual fibers holding the mat tend to work free from the base sheet. Although adhesives have been used with moderate success for the purpose of bonding the mat to the base sheet, the presence of an adhesive in the fabric greatly limits its utility because the flexibility of the final product is destroyed. Moreover, the adhesive alters the characteristically soft mat of fibers such that it becomes hard and rough thereby making the final product unsuitable for use in the fabrication of wearing apparel and the like.

According to this invention, a non-woven fabric is produced by depositing a layer of heat-sealable fibers on a relatively thin support. The support including the layer of fibers is then passed through a needle loom which will serve to needle some of the individual fibers through the support to form a composite wherein the support assumes a position in the approximate center of the layer of fibers. The composite including the support and the layer of fibers is then passed between a pair of heating rolls which will serve to fuse the outermost fibers of the composite. The heating step compresses the composite and imparts strength thereto due to the fusion of some of the fibers. In one embodiment of the invention, the support is a woven strip of textile material such as cheesecloth. In another embodiment, the support is a polymer film. In still another embodiment of the invention, the support comprises a plurality of strips of polymer material arranged in a common plane and spaced from each other a distance approximately equal to the width of each strip. When the support material is constructed from a polymer, it is preferred that the melting point of the polymer be less than the melting point of the heat-sealable fibers because the heating step can then be controlled to raise the temperature of the composite sufficiently to fuse the outermost fibers and to melt the support. This will cause the support to interlock the fibers in the center of the composite thereby contributing to the overall-all strength and stability of the composite.

The strengthened composite is then passed beneath a garnetting or carding machine which deposits and arranges a multitude of individual fibers into a layer on the upper surface of the composite. A similar layer of fibers can be deposited on the bottom surface of the composite by means of a second garnetting machine and an apron. The composite including the layers of fibers is then passed through a needle loom and needled to cause at least a portion of some of the individual fibers in each layer to be driven into the heat-sealed layer of fibers in the composite. The non-woven fabric produced in accordance with this invention is dimensionally stable and yet possesses soft outer surfaces which make the fabric particularly adaptable for use in the garment industries.

Accordingly, it is an object of this invention to provide a method of producing a non-woven fabric.

Another object of this invention is to provide a non-woven fabric having increased dimensional stability, strength, and flexibility.

Still another object of this invention is to provide a non-woven fabric having a soft outer surface.

A further object of this invention is to provide a non-woven fabric which is waterproof, mildewproof, and free from cellulosic staining.

These and other objects of the invention will become apparent to one skilled in the art after studying the following detailed description, the appended claims, and the accompanying drawing wherein:

FIG. 1 is a diagrammatic illustration of the several steps of the method for producing a non-woven fabric according to the invention;

FIG. 2 is a detail view in cross-section taken along the lines 2—2 of FIG. 1 illustrating the support for the layer of heat-sealable fibers;

FIG. 3 is a detail view in cross-section illustrating the article in a plane along the lines 3—3 of FIG. 1;

FIG. 4 is a detail view in cross-section illustrating the article in a plane along the lines 4—4 of FIG. 1;

FIG. 5 is a detail view in cross-section illustrating the article in a plane along the lines 5—5 of FIG. 1; and FIG. 6 is an enlarged detail view in cross-section illustrating a modified form of support for use in forming the non-woven fabric of the invention.

Referring now to the drawing, wherein like reference numerals are used to denote like elements, the invention will be described in more detail. In FIG. 1, a roll 10 of support material 11 of cheesecloth or polymer film is positioned such that the support can be unwound and passed beneath a garnetting machine 12. The garnetting machine 12 will function to deposit and arrange a multitude of individual heat-sealable fibers into a layer 13 on the uper surface of the support. Suitable materials which can be used for constructing the support of polymer film include polyethylene, polypropylene, polyvinylchloride, copolymers of vinylchloride and vinylacetate, polyvinylidene chloride, copolymers of vinylidene chloride and acrylonitrile, cellulose acetate, polyamides, polyesters and the like. The polymer film of support material can be cast, oriented, or blown in accordance with practices well known in the art. Although the thickness of the polymer film is largely a matter of choice, it is generally preferred that it be not less than about 0.001 inch because it must support the layer of fibers as they are being transported.

The fibers which are deposited and arranged on the support 11 by means of the garnett 12 can be constructed of any suitable synthetic material which can be heat sealed. Suitable materials which can be used for producing the fibers include polyethylene, polypropylene, acrylonitrile, copolymers of vinylidene chloride and acrylonitrile, cellulose acetate, polyamides, polyesters and the like.

The suport 11 including the layer 13 of fibers is then passed through a needle loom 14 having a plurality of barbed needles 16 which serve to effect a migration of some of the fibers into and through the support 11 thereby forming a composite of support material and fibers. Strength is imparted to the composite by passing it between a pair of opposed heating rolls 17 which function to raise the temperature of the outermost fibers thereby causing them to become fused together. The temperature of the heating rolls 17 and the residence time of the composite between them is carefully controlled to avoid melting the fibers in the center of the composite.

When the support 11 is constructed of a polymer material, it is preferred that its melting point be less than the melting point of the fibers. Since the needling step causes the support to assume a position in the approximate center of the layers of fibers, when the melting point of the support is less than the melting point of the fibers the temperature of the heating rolls can be controlled to cause the support to melt and thereby interlock the fibers in that region of the composite. The interlocking of the fibers in the center of the composite contributes to the over-all strength and stability of the product. If desired, the temperature in the center of the composite can be raised by means of a hot air knife or the like (not shown) which will function in cooperation with the heating rolls to provide the heat necessary to melt the support.

The outer surfaces of the heat-sealed composite thus formed are rough and hard because of the fused fibers. The rough surfaces are undesirable when the non-woven material is used in the fabrication of clothing or blankets because it can irritate the skin. This undesirable property of the non-woven fabric is overcome, in accordance with this invention, by passing the composite beneath a second garnetting machine 18 which will serve to arrange and distribute a multitude of natural or synthetic fibers into a layer 19 on the upper surface of the composite. An apron 21 in the form of an endless belt is arranged beneath the composite in a manner which will allow it to transport a second layer 22 of natural or synthetic fibers from a garnetting machine 23 into engagement with the bottom surface of the composite. The fibers in layers 19 and 22 can be constructed of synthetic materials such as polyethylene, polypropylene, acrylonitrile, polyamides, polyesters and the like. If desired, the fibers can be constructed of cotton, wool, flax and the like. The heat-sealed composite including the layers 19 and 22 of fibers is then passed between a pair of oppositely disposed needle looms 24 having a plurality of barbed needles 26. The needle looms 24 will serve to cause at least a portion of some of the fibers in layers 19 and 22 to be driven into the heat-sealed layer of fibers in the composite thereby securing both layers of fibers to the composite. This will result in the production of a non-woven fabric having a soft, smooth outer surface. If desired, the non-woven fabric can be passed between a pair of oppositely disposed nap rolls 27 or the like which will serve to fluff and comb the outer surfaces of the layers 19 and 22 thereby imparting still a softer texture to them. When it is desired to render only one surface of the composite soft by depositing a layer of films thereon, the apron 21 and garnetting machine 23 can be eliminated from the apparatus for producing the non-woven fabric. A single needle loom 24 and nap roll 27 will then suffice to finish the final product.

Referring to FIGS. 2 and 3 of the drawing, which illustrate the article at the stages indicated by lines 2—2 and 3—3 of FIG. 1, respectively, the support 11 is illustrated as being positioned in the approximate center of the layer 13 of heat-sealable fibers. The needling operation performed by means of the needle loom 14 has caused a portion of some of the individual fibers 28 to pass through the support 11. The needling operation in effect causes a migration of the support 11 into the approximate center of the layer 13.

As indicated by FIG. 4, the heat imparted to the composite by the heating rolls 17 causes it to become compressed and the individual fibers at the outer surfaces 29 and 31 to become fused together. This step will serve to strengthen the composite thereby providing the dimensional stability necessary in the final product. When the support 11 is constructed of a polymer with a melting point less than the melting point of the fibers, the temperature of the composite can be raised sufficiently to cause the support to melt and thereby interlock the center fibers. The temperature can also be regulated to effect a fusion between the individual fibers at the outer surfaces 29 and 31 at the same time at which the support is melted to interlock the fibers in the center of the composite.

FIG. 5 of the drawing illustrates the non-woven fabric after the layers 19 and 22 of fibers have been attached to the composite. The needle loom 24 will serve to drive at least a portion of some of the fibers 32 from layers 19 and 22 into the layer 13 of heat-sealed fibers in the composite. The non-woven fabric produced in accordance with this invention is rendered strong and dimensionally stable because of the support 11 and the layer 13 of heat-sealed fibers. The surfaces 33 and 34 are soft and smooth thereby increasing the utility of the non-woven fabric.

FIG. 6 of the drawing illustrates the support 11 in the form of a plurality of strips of polymer film arranged in a common plane. The strips can be wound in individual rolls and passed beneath the garnetting machine 12 in the same manner as the continuous surface strip. It is preferred to use a polyolefin film which has been oriented in a direction lengthwise with the strips to provide greater strength. Although the width of the strips and the distance between each strip is largely a matter of choice, it is generally preferred to use strips about ⅛-inch wide with a space between each strip of about ⅛ inch. It is apparent that this form of support results in a reduction of about 50 percent in the total amount of support material required.

Although the length and denier of the fibers used will be dictated by the use of the final product, it is generally preferred that the heat-sealable fibers in layer 13 be about 4½ inches long and from about 3 to about 6 denier. The fibers in layers 19 and 22 are preferably of a finer denier to provide a softer outer surface. Layers 19 and 22 can have a denier range of between about 1 and 3 with a preferred denier of about 1½.

The following specific examples will serve to illustrate the invention. It must be understood that such examples are for the purpose of illustration only and must not be considered to be limiting of the invention.

EXAMPLE I

A layer of 6-denier polyethylene fibers approximately 4½ inches long is carded, cross-lapped and deposited on a cheesecloth support such that the individual fibers are arranged transverse with respect to the direction of travel of the support. A composite including the support and layer of fibers can be formed by passing the support with the layer of fibers through a needle loom to effect a migration of the support into the center of the layer of fibers. The composite is then passed between a pair of opposed heating rolls which will serve to fuse the outermost layers of the composite. A layer of 2-denier acrylonitrile fibers approximately 3 inches long is then deposited and carded onto one surface of the composite. A second layer of 2-denier acrylonitrile fibers approximately 3 inches long is similarly deposited onto the opposite surface of the composite. The composite including the two layers of acrylonitrile fibers is then passed through a needle loom and needled to cause some of the acrylonitrile fibers in each layer to be driven into the heat-sealed layer of fibers in the composite. The needle product can then be passed between a pair of diametrically opposed nap rolls which will serve to comb and fluff the outer surfaces of the fabric.

EXAMPLE II

A layer of 5-denier polypropylene fibers approximately 5 inches long is deposited and carded on a support of polyethylene in the form of a strip approximately 0.002 inch thick. The support including the layer of fibers is passed through a needle loom to cause the fibers to be tangled into the polyethylene support to form a composite. The composite is then passed between a pair of heating rolls which are at a temperature such that the polypropylene fibers in the outer surfaces of the composite will become fused and the polyethylene support will melt thereby interlocking the fibers in the center of the composite. Separate layers of 2-denier polypropylene fibers approximately 3 inches long are deposited and carded on opposite surfaces of the heat-sealed composite. The composite including the two layers of polypropylene fibers is then passed through a needle loom which will serve to drive at least a portion of some of the 2-denier polypropylene fibers from each layer into the composite. The composite including the layer of 2-denier polypropylene fibers can then be passed between a pair of nap rolls to fluff and comb the outer surfaces of the fibers. Since this example illustrates the fabrication of a non-woven fabric entirely from polymer material, the final product is completely waterproof and mildewproof.

The non-woven fabrics made in accordance with this invention have unlimited utility in the garment and industrial arts. For example, the nonwoven fabrics can be used in the manufacture of wearing apparel and bedding materials. They are particularly suitable for use as carpet backing in the construction of tufted or pile fabric floor coverings.

Although the invention has been described in considerable detail, such detail is for the purpose of illustration only and many modifications and variations can be made by one skilled in the art without departing from the spirit and scope of the invention.

What is claimed is:

1. A method of producing a nonwoven fabric, comprising the steps of:
    depositing a layer of heat-sealable fibers on one surface of a polymer film said film having a melting point lower than the melting point of said fibers;
    needling said layer of fibers to pass some of the fibers through said film to form a composite wherein a portion of some of the fibers projects outward from the surfaces of said support; and
    passing the composite including the film and the layer of fibers in contact with heated rolls to compress the composite and impart strength thereto by fusing the individual fibers at both outer surfaces of the composite and melting said polymer film to interlock the fibers.

2. A method according to claim 1 wherein said heat-sealable fibers are polypropylene fibers and said polymer film is polyethylene film.

3. A method of producing a nonwoven fabric having a soft outer surface comprising the steps of depositing a layer of heat-sealable fibers on one surface of a polymer film, said film having a melting point less than the melting point of said fibers; needling said layer of fibers to pass some of the fibers through said film to form a composite wherein a portion of some of the fibers project outward from the surfaces of said film; heating the composite to fuse the outermost fibers and to melt said polymer film to interlock the fibers; depositing a layer of fibers on one surface of said composite; and needling said layer of fibers to pass at least a portion of some of the fibers into said composite to produce said soft outer surface.

4. A method according to claim 3 wherein said film is constructed of polyethylene and said heat-sealable fibers are constructed of polypropylene.

5. A method of producing a nonwoven fabric having a soft outer surface comprising the steps of depositing a layer of heat-sealable fibers on one surface of a polymer film said film having a melting point less than the melting point of said fibers; needling said layer of fibers to pass some of the fibers through said film to form a composite wherein a portion of some of the fibers project outward from the surfaces of said film; passing the composite including the film and the layer of fibers in contact with heated rolls to compress the composite and impart strength thereto by fusing the individual fibers at both outer surfaces of the composite and melting said polymer film to interlock the fibers; depositing a layer of fibers on at least one surface of said composite; and needling said layer of fibers to pass at least a portion of some of the fibers into said composite to produce said soft outer surface.

6. A method according to claim 5 wherein said film is constructed of polyethylene and said heat sealable fibers are constructed of polypropylene.

References Cited

UNITED STATES PATENTS

| | | | |
|---|---|---|---|
| 1,703,636 | 2/1929 | Rasch | 161—154 |
| 2,314,162 | 3/1943 | Reinhardt | 161—81 |
| 2,331,321 | 10/1943 | Heaton | 161—81 X |
| 3,166,823 | 1/1965 | Bernard | 28—72.2 |
| 3,241,214 | 3/1966 | Smith et al. | 28—72.2 |
| 3,298,080 | 1/1967 | Smith | 28—72.2 |
| 3,324,609 | 6/1967 | Stein et al. | 51—400 |

ROBBERT F. BURNETT, Primary Examiner

R. L. MAY, Assistant Examiner

U.S. Cl. X.R.

156—306; 161—154, 170